United States Patent [19]
König et al.

[11] Patent Number: 5,607,264
[45] Date of Patent: Mar. 4, 1997

[54] TOOL WITH DIAMOND CUTTING EDGE HAVING VAPOR DEPOSITED METAL OXIDE LAYER AND A METHOD OF MAKING AND USING SUCH TOOL

[75] Inventors: Udo König, Essen; Ralf Tabersky, Bottrop, both of Germany

[73] Assignee: Widia GmbH, Essen, Germany

[21] Appl. No.: 592,022

[22] Filed: Jan. 26, 1996

Related U.S. Application Data

[63] Continuation of Ser. No. 175,410, filed as PCT/DE92/00610, Jul. 23, 1992, abandoned.

[30] Foreign Application Priority Data

Aug. 14, 1991 [DE] Germany ............... 41 26 852.0

[51] Int. Cl.⁶ ............... B23B 27/20; C23C 16/26; C23C 16/40; C23C 28/04
[52] U.S. Cl. ............... 407/118; 82/1.11; 427/576; 51/309; 428/408; 428/702; 407/119
[58] Field of Search ............... 407/118, 119; 408/144, 145; 82/1.11; 51/295, 309; 427/255.3, 577, 576; 428/408, 689, 702

[56] References Cited

U.S. PATENT DOCUMENTS

| | | | |
|---|---|---|---|
| 4,341,834 | 7/1982 | Kikuchi et al. | 428/216 |
| 4,463,062 | 7/1984 | Hale | 428/698 |
| 4,605,343 | 8/1986 | Hibbs, Jr. et al. | 407/119 |
| 5,049,164 | 9/1991 | Horton et al. | 51/295 |
| 5,271,696 | 12/1993 | Stöck | 408/144 |

FOREIGN PATENT DOCUMENTS

| | | |
|---|---|---|
| 0166708A2 | 1/1986 | European Pat. Off. . |
| 0449571A1 | 10/1991 | European Pat. Off. . |
| 0454114A1 | 10/1991 | European Pat. Off. . |
| 2541432 | 4/1976 | Germany . |
| 3144192A1 | 7/1982 | Germany . |
| 3841731C1 | 4/1990 | Germany . |
| 3841730A1 | 6/1990 | Germany . |
| 61-41768 | 2/1986 | Japan . |
| WO87/05831 | 6/1987 | WIPO . |

OTHER PUBLICATIONS

R. Funk et al. (Wear, vol. 32 (1975) pp. 391–393.
Proceedings vol. 3 12-th International Plansee Seminar, Article by Bildstein et al.

*Primary Examiner*—M. Rachuba
*Assistant Examiner*—Kenneth J. Hansen
*Attorney, Agent, or Firm*—Herbert Dubno

[57] ABSTRACT

In order to improve the wear characteristics of tools with diamond cutting edges, it is proposed to coat the diamond body with a 0.5 to 6 μm thick layer of at least one oxide of the metals zirconium and/or yttrium and/or magnesium and/or titanium and/or aluminum, preferably aluminum oxide. The coating is deposited from the gas phase at gas-phase temperatures up to 800° C. Preferably the pulse-plasma CVD process is used for the coating. The diamond tools so coated are particularly suited for chip-forming machining of carbon-affinitive materials, such as iron-containing materials or steel.

12 Claims, No Drawings

TOOL WITH DIAMOND CUTTING EDGE HAVING VAPOR DEPOSITED METAL OXIDE LAYER AND A METHOD OF MAKING AND USING SUCH TOOL

This is a continuation of application Ser. No. 08/175,410 filed on 30 Dec. 1993 now abandoned.

SPECIFICATION

CROSS REFERENCE TO RELATED APPLICATIONS

This application is a national phase of PCT/DE92/00610 filed 23 Jul. 1992 and based in turn on German national application P41 26 852.0 filed 14 Aug. 1991 under the International Convention.

1. Field of the Invention

Our present invention relates to a tool with a wear-resistant diamond cutting edge, whereby the surface of the tool has diamond crystals, the invention also relates to a process for manufacture of the tool and to its use.

2. Background of the Invention

It has been long known to use tools made of monocrystalline or polycrystalline diamond (monoblocks), or tools whose cutting edges have been reinforced by soldered-in or glued-in inserts of monocrystalline or polycrystalline diamond bodies (inlays), or tools wherein at least one cutting edge is coated with polycrystalline or amorphous diamond, for the chip-forming machining of particularly hard materials, for instance rock, composite materials with mineral fillers, aluminum-silicon alloys and the like.

However it has been found that tools made of diamond or with diamond inlays or coatings, in spite of their otherwise good wear characteristics, are not suited for the chip-removal machining of carbon-affinitive materials, particularly iron or steel materials with this particular group of materials at machining temperatures above 700° C. a high degree of wear of the diamond cutting edge takes place. The reason is a diffusion wear at the cutting edge, which has not yet been explained in detail.

Polycrystalline diamonds consist of a multitude of mostly synthetically produced single diamond crystals, which have been bonded under high pressure and with metallic bonding agents (e.g. Fe, Ni, Co, etc) into a massive body. Polycrystalline diamonds, free from bonding agents, are also known.

For instance B. Lux, R. Haubner "Low Pressure Synthesis of Superhard Coatings", Proceedings of the 12th International Plansee Seminar 1989, Volume 3; p. 615–660, describe how to produce with a high-temperature CVD process a polycrystalline diamond body free from bonding agents with a thickness of approximately 0.5 mm and with a rough surface, by deposition on a smooth support substrate. The diamond body is detached from the support substrate and subsequently fastened to a tool as an inlay. The rough diamond surface is used as an adherence area, while the smooth surface of the polycrystalline, bonding-free diamond which has been detached from the support substrate is used as the cutting edge or the like.

As a rule diamond-coated tools consist of a substrate body, at least one diamond-free intermediate layer and an outer, polycrystalline or amorphous diamond layer. The intermediate layer is necessary in order to provide sufficient adherence of the diamond layer to the composite body consisting of the substrate body and the intermediate layer.

For instance in EP 0 166 708 it is proposed to provide substrate bodies of metal, metal alloy, hard metal or ceramic, which are to be coated with polycrystalline diamond, with a thin intermediate layer of noble metal or carbides, nitrides, carbonitrides, oxycarbides, oxides or borides of the metals of Groups IVb to VIb of the Periodic Table of the Elements and mixtures thereof.

R. Funk, B. Lux and P. Stecker (see Wear, Vol. 32 (1974), pages 391–393) have proposed to produce diamond-reinforced tools by embedding of diamond powder with a grain size <10 µm in the hard metal through pressure sintering. According to a further method of manufacturing, tools with a smooth, diamond-containing surface are produced by embedding the finest diamond powder (grain size <1 µm) in layers of pure hard material, e.g. into TiC deposited from a gas phase.

In order to improve the embedding of diamonds in the layer of hard material and to increase the wear resistance of the diamond cutting edge, R. Bichler, J. Peng, R. Haupner, B. Lux (see "Preparation of a diamond/corundum layer composite using low pressure diamond pa-cvd", 3rd International Conference on the Science of Hard Materials, 8–13 Nov. 1987 Nassau) have proposed that the surface of a composite hard-material body having a WC-basis, in whose 6 µm thick TiC layer, diamond crystals with a diameter of 10 to 12 µm are embedded with a density of 1 crystal/100 µm, thus avoiding the formation of a continuous layer, be coated with a 3 µm thick, crystalline $Al_2O_3$-layer in a subsequent high-temperature CVD process.

However, cutting bodies produced this way have the following disadvantages:

The embedded diamonds do not form a continuous layer completely covering the composite body, so that the good cutting efficiency of the diamond is only incompletely used.

Due to the thermal stresses during cooling as a result of the different heat-expansion coefficients of diamond and $Al_2O_3$, the $Al_2O_3$-layer adhering to the diamond crystals shows cracks.

The $Al_2O_3$-layer adheres only weakly to the diamond.

An appropriate process for producing wear-reducing layers is the CVD process (chemical vapor deposition). In this process the wear-reducing layer is deposited from the gas phase at high temperatures. In addition plasma-activated CVD processes are known, which work at low gas-phase temperatures.

For instance in DE 38 41 730 and DE 38 41 731, a pulse-plasma CVD process for coating a metallic substrate body with a nonconductive coating material, particularly $Al_2O_3$, is described, wherein to the substrate body connected as cathode a pulsed direct voltage of 200 to 900 V and with a pulse duration of 50 µs is applied. In the pulse pauses of 80 µs a residual voltage is maintained which is higher than the lowest ionization potential of the molecule participating in the CVD process, but not higher than 50% of the maximum voltage, and wherein the coating takes place at gas-phase temperatures between 400° C. and 800° C.

OBJECTS OF THE INVENTIONS

It is an object of the invention to provide an improved tool with a wear-resistant diamond cutting edge, whose wear characteristics are considerably improved by avoiding the above-described drawbacks.

It is a further object of the present invention to provide a process for manufacturing the tool with the wear-resistant diamond cutting edge.

Finally it is an object of the present invention to provide a use of the tool with a wear-resistant diamond cutting edge.

SUMMARY OF THE INVENTION

The basic object of the invention is achieved with a tool, whose continuous diamond layer is coated with a thin layer of one or more metal oxides of a thickness of at least 1 μm.

The thickness of the oxide layer can range up to 6 μm, and is preferably 1 to 3 μm, while the thickness of the diamond layer goes up to 2 mm. For the metallic oxide layer the oxides of zirconium and/or yttrium and/or magnesium and/or titanium and/or aluminum are used. Preferably layers of aluminum oxide are applied.

Surprisingly it has been found that a tool of this design when used for chip-formation machining of various materials has not only an excellent wear resistance, but, based on the low wear of the diamond cutting edge, is suitable also for chip-formation machining of carbon-affinity materials, particularly materials containing iron or steel.

By testing an aluminum-oxide layer according to the invention on a substrate of polycrystalline diamond with a microhardness testing device, it has been found for instance that the found Vickers hardness values of the $Al_2O_3$-layer of the invention (HV05=2800 to 3500) is considerably higher than the known values of $Al_2O_3$ (HV05=1800 to 2200. Obviously the thin aluminum-oxide layer supported by the very hard diamond substrate opposes a considerably higher resistance to the intruding body.

The oxide layers deposited on diamond also show a particularly fine crystalline structure. According to a feature of the invention, the oxide layer of the invention is applied to a polycrystalline or amorphous diamond layer covering a composite body, whereby between the diamond layer and the substrate body there is at least one diamond-free intermediate layer, consisting of metals of the Groups IVb to VIb of the Periodic Table of the Elements and/or carbides and/or nitrides and/or carbides of elements of the Groups IVb to VIb of the Periodic Table of Elements, preferably TiC and/or hard boron compounds, e.g. $TiB_2$, $B_4C$, CBN, as well as noble metals.

As substrate bodies hard metals or cutting ceramics or silicon nitride or silicon-aluminum-oxynitride or cermets or tool steels are used.

According to a further development of the invention, the oxide layer of the invention is applied to a tool with an insert of monocrystalline or polycrystalline diamond (inlay).

Finally the oxide layer of the invention can be applied to a monocrystalline or polycrystalline diamond, which are used as cutting tools in the form of massive bodies (monoblock).

The polycrystalline diamonds used in the various embodiments of the invention can be free of bonding agents or can contain 5 to 50% by weight, preferably 10 to 25% by weight, metallic or ceramic bonding agents. Cobalt, nickel, tungsten and other metals are used as bonding agents. Preferably the bonding agent is cobalt.

According to a further, particularly advantageous embodiment of the invention, the oxide layer is not deposited on the entire surface entirely covered by diamond, but only at locations where the diamond cutting edge is actually subjected to wear, so that the diamond or the diamond layer is only partially covered by the oxide layer.

According to a further development of the invention oxide layers which differ from each other are alternately deposited on the surface of a tool which consists entirely or partially of diamond.

This multiple coating can also be applied only there where the diamond cutting edge is actually subjected to wear, so that the diamond, respectively the diamond cutting edge is only partially covered by the multiple coating consisting of oxide layers which differ from each other.

The basic object of this invention is further achieved by using a process for manufacturing the tool with wear-resistant diamond cutting edge, according to which the wear-reducing layer, consisting of one or more metal oxides, is applied to the diamond at gas-phase temperatures below 800° C. Preferably the gas-phase temperature ranges between 400° C. and 600° C.

Surprisingly it has been found that the bond between diamond, respectively diamond layer and the oxide layer is particularly good at low deposition temperatures and that the oxide layer so applied adheres strongly to the diamond.

In addition, the oxide layer is extensively dense and shows no cracks.

Since the deposition of the oxide layer takes place at considerably lower temperatures than in the high-temperature CVD process, the thermal stresses between the oxide layer and the diamond, occurring during cooling as a result of the different heat-expansion coefficients, are considerably lower, so that the formation of cracks can be avoided and an extensively dense oxide layer results. This applies particularly to $Al_2O_3$-layers.

A further advantage of the process according to the invention consists in that the tool with soldered-in or glued-in inlays can be coated as a complete tool, i.e. with the already fastened diamonds, since in the process of the invention the gas-phase temperatures are selected so that they do not reach the melting temperature of the solder or the adhesive.

Due to these steps, it is especially possible to avoid damage to the oxide layer during the otherwise required subsequent mounting.

According to the invention it is particularly advantageous to use plasma-activated CVD processes, particularly the pulse-plasma CVD process, for producing the oxide layer.

By using the pulse-plasma CVD process and by setting the following test parameters, particularly good results have been obtained in the production of the oxide layer:

| | |
|---|---|
| Temperature of the gas phase: | 400° C. to 600° C. |
| Direct voltage: | −300 V to 600 V |
| Residual voltage: | −20 V to 60 V |
| Pulse duration: | 30 μs to 60 μs |
| Pulse pause: | 40 μs to 100 μs |
| Gas pressure: | 50 Pa to 500 Pa |

The body to be coated was connected as cathode.

The basic object of the invention is finally achieved by the use of the tool with wear-resistant diamond cutting edge for the chip-forming machining of carbon-affinitive materials.

According to the invention it is particularly advantageous to use the tool with wear-resistant diamond cutting edge for the chip-forming machining of iron and steel materials.

Subsequently the object of the invention is explained with the aid of embodiment examples.

EXAMPLE 1

An indexable insert of the shape SCMW 120408 (designation according to DIN 4987) consisting of a hard-metal alloy with 94% by weight of tungsten carbide and 6% by weight cobalt, provided with a 2 μm thick intermediate layer of molybdenum was coated through a high-temperature CVD process on a cutting edge with an approximately 6 μm thick layer of polycrystalline diamond.

This indexable insert was subsequently coated with $Al_2O_3$ according to the pulse-plasma CVD process of DE 38 41 730 and DE 38 41 731, under the following test parameters:

|  |  |
| --- | --- |
| Gas-phase temperature: | 600° C. |
| Gas pressure: | 250 Pa |
| Direct voltage: | −550 V |
| Residual voltage: | −40 V |
| Pulse length: | 50 μs * |
| Pulse duration: | 80 μs * |
| Coating duration: | 2 h |

*[should be pulse duration and pulse pause, translator's note]

* [should be pulse duration and pulse pause, translator's note]

A subsequent examination of the indexable insert coated with $Al_2O_3$ showed that a 2 μm thick layer of $Al_2O_3$ was deposited, which adhered very well to the hard-metal composite body. Through X-ray diffraction analysis it was established that the layer consists of very fine-grained aluminum oxide of the alpha modification. The Vicker hardness of the $Al_2O_3$-layer was found to be HV0.05=3100. No cracks were found in the $Al_2O_3$-layer.

The indexable insert of the invention was subsequently subjected to a chip-formation machining comparative test together with an identical indexable insert, but which was not coated with $Al_2O_3$.

The tests were performed as continuous-cutting turning tests on a ball-bearing steel 100Cr6 with a Rockwell hardness of 60 HRC. The cutting speed was 130 m per minute, the cutting depth was 0.5 mm and the advance 0.08 mm per rotation. The tests were concluded when a wear mark width of 0.2 mm could be found.

This wear mark width appeared after 12 minutes in the case of indexable inserts coated only with polycrystalline diamond and not with $Al_2O_3$, while the indexable inserts of the invention, additionally coated with $Al_2O_3$ showed a corresponding wear mark only after 65 minutes of use.

EXAMPLE 2

In a recess of a hard-metal indexable insert, consisting of 94% by weight tungsten carbide and 6% by weight cobalt, in the shape SCMW 120408 (designation according to DIN 4987) an inlay of approximately 3×3×0.5 mm of compacted, polycrystalline diamond is fastened by means of a solder melting at 800° C. The content of bonding metal of the polycrystalline diamond amounted to 16% by weight. A cobalt-tungsten alloy was used as a bonding metal.

This indexable insert was subsequently coated with $Al_2O_3$ under the test parameters mentioned in Example 1.

The following examination of the indexable insert coated with $Al_2O_3$ showed that the entire surface of the indexable insert, including the diamond inlay was covered with a 2 μm thick layer of finely distributed polycrystalline $Al_2O_3$ of the alpha modification, strongly adhering to the diamond. On the diamond inlay the $Al_2O_3$-layer has a Vickers hardness of HV005=3000. After the coating procedure, the soldered-in inlay was in unchanged position strongly connected to the hard-metal support.

On a ball-bearing steel 100Cr6 with a Rockwell hardness of 60 HRC turning tests under continuous cutting conditions have been performed with the indexable insert with diamond inlay of the invention, in comparison with the same indexable inserts not coated with $Al_2O_3$, in the same test conditions as mentioned in Example 1.

In the indexable inserts with diamond inlay which were not coated with $Al_2O_3$ the wear mark width of 0.2 mm was reached already after 12 minutes, while the indexable inserts provided with the diamond inlay and coated with $Al_2O_3$ showed a wear mark width of 0.2 mm only after a use of 68 minutes.

We claim:

1. A method of machining a body of a carbon-affinity material, comprising the steps of:

(a) forming a cutting tool by providing a support forming a substrate, affixing a diamond structure to said support and forming a cutting edge thereon, and vapor depositing at least one dense crack-free fine-crystalline layer of at least one metal oxide onto said diamond structure at least at said cutting edge to a thickness in excess of 1 μm from a gas phase at a substrate temperature below 800° C., said diamond structure being a continuous diamond layer of a thickness of 0.5 μm to 2 mm and said dense crack-free fine-crystalline layer of at least one metal oxide having a thickness up to 3 μm; and (b) effecting chip removal from said body by urging said cutting tool thereagainst.

2. A tool comprising:

a support forming a substrate;

a diamond structure affixed to said support and forming a cutting edge thereon; and at least one dense crack-free fine-crystalline layer of at least one metal oxide vapor-deposited onto said diamond structure at least at said cutting edge to a thickness in excess of 1 μm from a gas phase at a substrate temperature below 800° C., said diamond structure being a continuous diamond layer of a thickness of 0.5 μm to 2 mm and said dense crack-free fine-crystalline layer of at least one metal oxide having a thickness up to 3 μm.

3. The tool defined in claim 2 wherein said metal oxide is an oxide of at least one metal selected from the group which consists of magnesium, yttrium, titanium, zirconium and aluminum.

4. The tool defined in claim 3 wherein said metal oxide is aluminum oxide.

5. The tool defined in claim 3 wherein said dense crack-free fine-crystalline layer of at least one metal oxide is applied to said diamond structure only at regions subject to machining wear.

6. The tool defined in claim 3 wherein said diamond structure is a layer of amorphous diamond.

7. The tool defined in claim 3 wherein said substrate comprises said support and a diamond-free intermediate layer on said support, said diamond structure being provided on said diamond-free intermediate layer.

8. The tool defined in claim 3 wherein said diamond structure is a monocrystalline diamond inlay.

9. The tool defined in claim 3 wherein said diamond structure is a polycrystalline diamond body bonded with up to 50% by weight of metallic bonding agents.

10. The tool defined in claim 3 wherein a plurality of successive layers of metal oxide are applied to said diamond structure.

11. A method of making a tool, comprising the steps of:

(a) providing a support forming a substrate;

(b) affixing a diamond structure to said support and forming a cutting edge thereon; and (c) vapor depositing at least one dense crack-free fine-crystalline layer of at least one metal oxide onto said diamond structure at least at said cutting edge to a thickness in excess of 1 μm from a gas phase at a substrate temperature below 800° C., said diamond structure being a continuous diamond layer of a thickness of 0.5 μm to 2 mm and said dense crack-free fine-crystalline layer of at least one metal oxide having a thickness up to 3 μm.

12. The method defined in claim 11 wherein said metal oxide is vapor deposited onto said diamond structure from a gas phase at a temperature of 400° C. to 600° C. by pulse-plasma activated CVD.

* * * * *